United States Patent
Flygare

(10) Patent No.: US 12,024,014 B2
(45) Date of Patent: Jul. 2, 2024

(54) ELECTRICALLY POWERED, UNIVERSAL ACCESSORY DRIVE

(71) Applicant: Husqvarna AB, Huskvarna (SE)

(72) Inventor: Anders Flygare, Jönköping (SE)

(73) Assignee: HUSQVARNA, Huskvarna (SE)

( * ) Notice: Subject to any disclaimer, the term of this patent is extended or adjusted under 35 U.S.C. 154(b) by 848 days.

(21) Appl. No.: 17/051,569

(22) PCT Filed: Oct. 31, 2019

(86) PCT No.: PCT/IB2019/059370
§ 371 (c)(1),
(2) Date: Oct. 29, 2020

(87) PCT Pub. No.: WO2020/245644
PCT Pub. Date: Dec. 10, 2020

(65) Prior Publication Data
US 2021/0309102 A1    Oct. 7, 2021

(30) Foreign Application Priority Data

Jun. 4, 2019   (SE) .................................. 1950655-9

(51) Int. Cl.
*B60K 17/28*    (2006.01)
*A01D 34/78*    (2006.01)
(Continued)

(52) U.S. Cl.
CPC .............. *B60K 17/28* (2013.01); *A01D 34/78* (2013.01); *A01D 69/02* (2013.01); *B60K 17/22* (2013.01);
(Continued)

(58) Field of Classification Search
CPC .... A01D 2101/00; A01D 69/02; A01D 34/78; B60K 17/28
See application file for complete search history.

(56) References Cited

U.S. PATENT DOCUMENTS 4,242,855 A * 1/1981 Beaver, Jr. ........... A01D 34/001
56/16.8
5,136,197 A 8/1992 Hallett
(Continued)

FOREIGN PATENT DOCUMENTS

AU            699866 B2    12/1998
CN          202679988 U     1/2013
(Continued)

OTHER PUBLICATIONS

International Search Report and Written Opinion for International Application No. PCT/IB2019/059370 dated Jul. 1, 2020.
(Continued)

*Primary Examiner* — James A English
(74) *Attorney, Agent, or Firm* — Burr & Forman LLP

(57) ABSTRACT

A modular drive assembly may include an electric motor, a housing at least partially enclosing the motor, an electronic connection assembly configured to electrically couple the electric motor to a host device, and an accessory attachment assembly configured to mechanically couple the modular drive assembly to an accessory to operate a working assembly of the accessory using only electrical power provided from the host device. The accessory attachment assembly may be configured to be releasably attached to the accessory and at least one other accessory of a different type than the accessory.

20 Claims, 5 Drawing Sheets

(51) Int. Cl.
  *A01D 69/02* (2006.01)
  *B60K 17/22* (2006.01)
  *B60R 16/03* (2006.01)
  *F16D 1/10* (2006.01)
  *A01D 34/43* (2006.01)
  *A01D 34/64* (2006.01)
  *A01D 42/06* (2006.01)
  *A01D 101/00* (2006.01)
  *E01H 1/05* (2006.01)
  *E01H 5/09* (2006.01)

(52) U.S. Cl.
  CPC ............... *B60R 16/03* (2013.01); *F16D 1/10* (2013.01); *A01D 34/43* (2013.01); *A01D 34/64* (2013.01); *A01D 42/06* (2013.01); *A01D 2101/00* (2013.01); *E01H 1/056* (2013.01); *E01H 5/098* (2013.01)

(56) References Cited

U.S. PATENT DOCUMENTS

| | | | |
|---|---|---|---|
| 5,170,851 A | 12/1992 | Kress et al. | |
| 6,484,484 B1 | 11/2002 | Thomas | |
| 6,675,562 B2 | 1/2004 | Lawrence | |
| 8,104,252 B1* | 1/2012 | Godley, Jr. | A01D 42/04 56/2 |
| 9,663,159 B2* | 5/2017 | Ertel | B60K 17/28 |
| 9,991,825 B1* | 6/2018 | Ackerman | H02P 7/06 |
| 2002/0175007 A1 | 11/2002 | Strong | |
| 2003/0079455 A1* | 5/2003 | Suchdev | A01B 1/065 56/16.9 |
| 2010/0132229 A1 | 6/2010 | Chahino | |
| 2014/0144117 A1* | 5/2014 | Schygge | A01D 34/662 56/10.6 |
| 2016/0338266 A1* | 11/2016 | Yamaoka | A01D 34/82 |
| 2017/0079201 A1* | 3/2017 | Jägenstedt | B60L 8/003 |
| 2018/0042173 A1 | 2/2018 | Henson | |
| 2018/0076653 A1 | 3/2018 | Forster et al. | |
| 2018/0103581 A1* | 4/2018 | Neely | A01D 34/18 |
| 2018/0104809 A1* | 4/2018 | Dyer | B27B 17/0016 |

FOREIGN PATENT DOCUMENTS

| | | |
|---|---|---|
| DE | 2017981 A1 | 10/1971 |
| DE | 2913943 A1 | 10/1980 |
| DE | 102010047233 A1 | 7/2012 |
| DE | 202013010073 U1 | 9/2014 |
| EP | 1508266 A2 | 2/2005 |
| EP | 1803342 A1 | 7/2007 |
| JP | 2015188441 A | 11/2015 |
| KR | 20180069511 A1 | 6/2018 |

OTHER PUBLICATIONS

Swedish Office Action and Search Report for Swedish Application No. 1950655-9, dated Dec. 4, 2019.
"Flex™ Wide-Area MOWE-Troy-Blit", Retreived From https://www.troybilt.com/equipment/troybilt/flex-wide-area-mower and https://www.youtube.com/watch?v=A64q6KRt2hY, 6 Pages.

* cited by examiner

ELECTRICALLY POWERED, UNIVERSAL ACCESSORY DRIVE

CROSS REFERENCE TO RELATED APPLICATION

This application claims priority to Swedish application number 1950655-9 filed Jun. 4, 2019, the entire contents of which are hereby incorporated by reference in its entirety.

TECHNICAL FIELD

Example embodiments generally relate to yard maintenance vehicles and, more particularly, relate to a yard maintenance vehicle that can alternately be mated with a number of accessories without a need for belts, chains, power take off (PTO), or other mechanical drive-based connections for the accessories.

BACKGROUND

Lawn care tasks are commonly performed using various tools and/or machines that are configured for the performance of corresponding specific tasks. Certain tasks, like grass cutting, are typically performed by lawn mowers. Other tasks, like snow removal, may be performed by a snow blower, while sweeping, tilling or other functions are similar performed by respective devices configured accordingly. Some lawn mowers, e.g., lawn tractors or other riding yard maintenance vehicles can sometimes be configured with various functional accessories (e.g., trailers, tillers, plows, snow blower attachments, lawn cutting blade attachments, bagging attachments and/or the like) to enable the device to tackle numerous different tasks depending on the accessories added thereto.

As can be appreciated from the description above, riding yard maintenance vehicles may come in many different sizes and may have wide variances in their capabilities. However, beyond mere changes in size and function, riding yard maintenance vehicles can also be produced with a great deal of variation in relation to the configurations via which various ones of the functions they can perform are provided. For example, some riding yard maintenance vehicles may have attachments that are rear mounted, front mounted, or even mounted between the front and back wheels. The many possible variations in configuration may enable designers to produce specific device configurations that are able to excel in certain difficult operating environments. However, this variation can also complicate efforts to make fully interchangeable accessories due to a corresponding typical requirement to configure the accessory to define interfaces for mating with a PTO shaft, belt/chain drive assembly or other such means by which to operably couple the accessories to the respective devices.

Accordingly, it may be desirable to develop a way that accessories could be coupled to riding yard maintenance vehicles (or other outdoor power equipment) with simpler and/or more flexible interfaces.

BRIEF SUMMARY OF SOME EXAMPLES

Some example embodiments may provide a modular drive assembly that may include an electric motor, a housing at least partially enclosing the motor, an electronic connection assembly configured to electrically couple the electric motor to a host device, and an accessory attachment assembly configured to mechanically couple the modular drive assembly to an accessory to operate a working assembly of the accessory using only electrical power provided from the host device. The accessory attachment assembly may be configured to be releasably attached to the accessory and at least one other accessory of a different type than the accessory.

In another example embodiment, a riding yard maintenance vehicle is provided. The riding yard maintenance vehicle may include a frame to which wheels of the riding yard maintenance vehicle are attachable, and a steering assembly operably coupled to one or more of the wheels of the riding yard maintenance vehicle to provide steering inputs to the one or more of the wheels by an operator of the riding yard maintenance vehicle. The riding yard maintenance vehicle may be configurable as a host device responsive to operable coupling of an attachment and a modular drive assembly to the frame of the riding yard maintenance vehicle. The modular drive assembly may include an electric motor, a housing at least partially enclosing the motor, an electronic connection assembly configured to electrically couple the electric motor to the host device, and an accessory attachment assembly configured to mechanically couple the modular drive assembly to the accessory to operate a working assembly of the accessory using only electrical power provided from the host device. The accessory attachment assembly is configured to be releasably attached to the accessory and at least one other accessory of a different type than the accessory.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
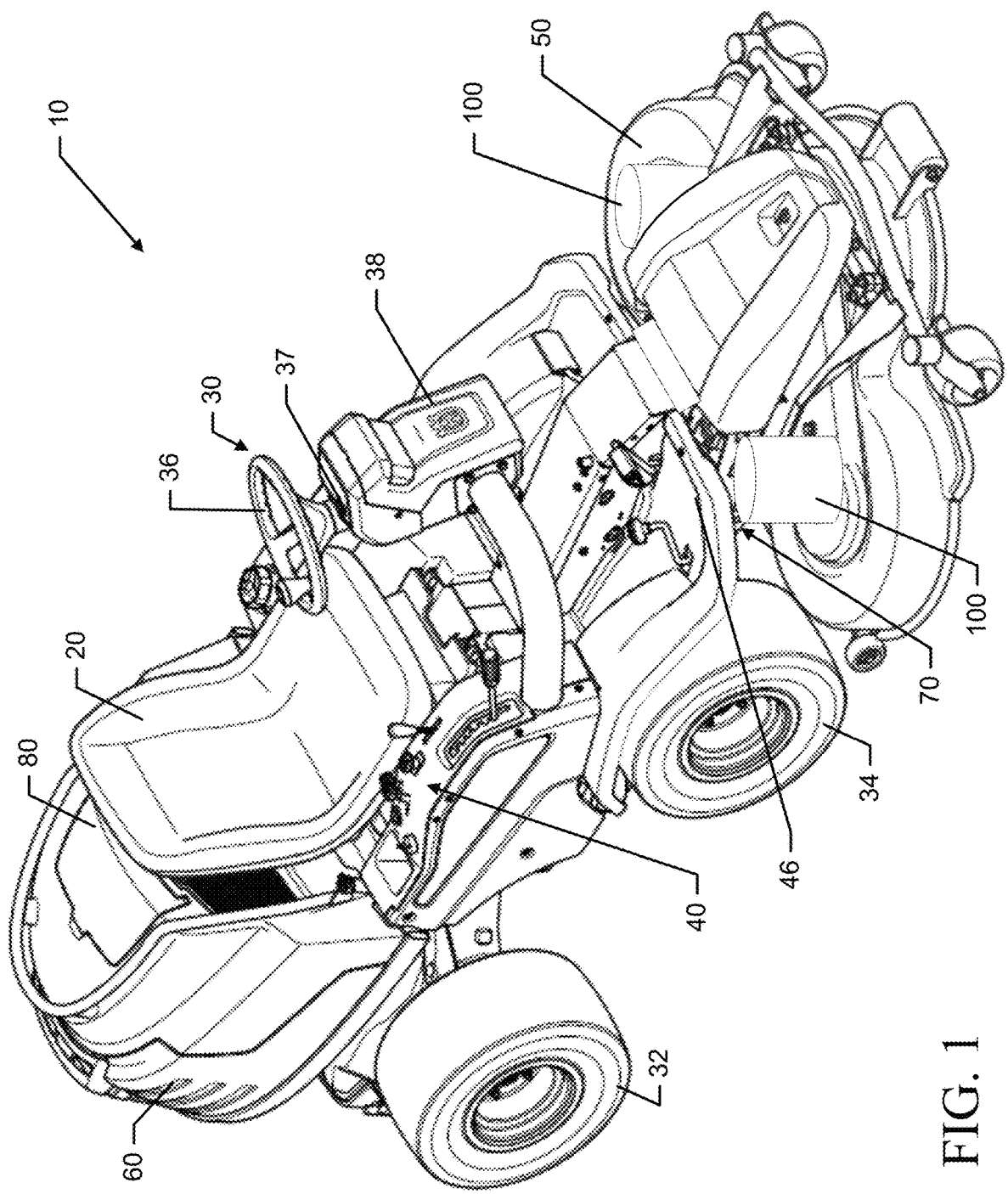
FIG. 1 illustrates a perspective view of a riding yard maintenance vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide a modular drive assembly that can drive accessories of a riding yard maintenance vehicle (or other host device) without mechanical interfaces between the drive assembly and the riding yard maintenance vehicle (or other host device). In this regard, for example, the modular drive assembly may include a universal mechanical interface that is configured to mate with a plurality of different types of accessories (e.g., accessories that perform different functions such as mowing, sweeping, snow blowing, brush cutting, tilling, etc.) and turn the working assembly of each. However, the modular drive assembly may not receive any mechanical power from the host device (i.e., the riding yard maintenance vehicle or other outdoor power equipment). Instead, other than physically providing a mounting surface or structure from which to drive the accessory, the interface between the modular drive assembly and the host device may be purely electrical.

In an example embodiment, the modular drive assembly may therefore include a housing or encapsulation that is configured to be mounted or supported at the host device, but otherwise only be operably coupled to the host device via an electrical connection. The modular drive assembly may include an electric motor (e.g., a brushless direct current— BLDC or other electric motor) located within the housing and operably coupled to an attachment interface. The modular drive assembly may or may not include gearing and, in some cases, different styles or grades of modular drive assembly may be provided to include gearing for corresponding different accessories.

FIG. 1 illustrates a riding yard maintenance vehicle 10 as one example of a host device that may employ a module drive assembly according to an example embodiment. The particular model shown, which includes front mounted accessories, is not necessarily the only model of host device or vehicle to which example embodiments may be applicable. As such, other models, including models without rear mounted accessories, accessories mounted between the front and rear wheels, or even walk-behind host devices, could also be operated with the module drive assembly as described herein.

In some embodiments, the riding yard maintenance vehicle 10 may include a seat 20 that may be disposed at a center, rear or front portion of the riding yard maintenance vehicle 10. The riding yard maintenance vehicle 10 may also include a steering assembly 30 (e.g., a steering wheel, handle bars, joystick(s) or the like) operably coupled to rear wheels 32 of the riding yard maintenance vehicle 10 to allow the operator to steer the riding yard maintenance vehicle 10 via steering inputs that are communicated to the rear wheels 32. In some examples, the steering assembly 30 may include steering levers that are operably coupled to the rear wheels 32 via a hydrostatic drive assembly. Since steering control is provided to the rear wheels 32, the front wheels 34 may not receive steering inputs in some embodiments. However, other steering arrangements are possible in other embodiments and the type of steering assembly 30 employed is not limiting to example embodiments. The operator may sit on the seat 20, which may be disposed to the rear of the steering assembly 30 to provide input for steering of the riding yard maintenance vehicle 10 via the steering assembly 30.

In an example embodiment, the steering assembly 30 may include a steering wheel 36 and a steering column 37. The steering column 37 may operably connect to additional steering assembly components or, in other embodiments, to the front wheels 34. Moreover, in some embodiments, the steering column 37 may extend into a steering console 38, which may provide a cover to improve the aesthetic appearance of the riding yard maintenance vehicle 10 by obscuring the view of various mechanical components associated with the steering assembly 30.

The riding yard maintenance vehicle 10 may also include additional control related components that may be disposed at a control panel 40. The control related components may include levers, switches and/or the like configured to provide control over certain functions or components such as a blade speed adjuster, a choke control, a cutting height adjuster and/or a cutting unit lifting controller. In some cases, the control panel 40 may also include controls for operation of the modular drive assembly 100 of example embodiments described in greater detail below. Moreover, in some cases, one or more additional controllers, may be provided in the form of foot pedals that may sit proximate to a footrest 46 (which may include a portion on both sides of the riding yard maintenance vehicle 10 (e.g., on opposite sides of the steering console 38)) to enable the operator to rest his or her feet thereon while seated in the seat 20. These foot pedals may provide speed control for forward and/or backward operation, breaking, cutting deck lifting or other functions. Other levers, operators or components are possible in other examples as well.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding yard maintenance vehicle 10 to which steering inputs are provided. For example, the steering assembly 30 may include or otherwise be coupled with a steering cable assembly or a system of mechanical linkages (e.g., pulleys, tie rods, cams, and/or other mechanical components) to translate rotational motion applied to the steering assembly 30 (and more particularly to the steering wheel 36) into directional inputs to orient the wheels accordingly. Other steering control systems may be employed in some alternative embodiments.

The riding yard maintenance vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blades when the cutting blades are rotated below the cutting deck 50 and the cutting deck 50 is in a cutting position. When operating to cut grass, some example embodiments may provide that the grass clippings may be captured by a collection system, mulched, or expelled from the cutting deck 50 (e.g., via a discharge that may be directed to a side or rear of the cutting deck and/or riding yard maintenance vehicle 10).

In some embodiments, the cutting deck 50 may be replaced by other working attachments to change the configuration of the riding yard maintenance vehicle 10 and correspondingly change the tasks that may be performed by the riding yard maintenance vehicle 10. Thus, for example, a plow blade or snow blower attachment may be provided to convert the riding yard maintenance vehicle 10 into a snow removal device. Alternatively, a tiller attachment may be provided to convert the riding yard maintenance vehicle 10 into a ride-on or remote control operable tiller. Other attachments and configurations are also possible such as a sweeper, brush cutter, or the like. In each case, the different type of attachment may be considered to be a respective different type of accessory that can be powered by the riding yard maintenance vehicle 10 (as one example host device). However, as noted above, the different types of accessories may each be operably coupled to the riding yard maintenance vehicle 10 via an example instance (or multiple instances) of the modular drive assembly 100 of example embodiments. Moreover, in this case, since there are multiple blades in the cutting deck 50, each blade may be powered or rotated by its own respective instance of the modular drive assembly 100.

In the pictured example embodiment of FIG. 1, an engine of the riding yard maintenance vehicle 10 is disposed in an engine compartment 60 that is behind a seated operator in a rear portion of the riding yard maintenance vehicle 10. However, in other example embodiments, the engine could be in different positions such as in front of or below the operator. In some embodiments, the engine may be operably coupled to one or more of the wheels of the riding yard maintenance vehicle 10 in order to provide drive power for the riding yard maintenance vehicle 10. In some embodiments, the engine may be capable of powering two wheels, while in others, the engine may power all four wheels of the riding yard maintenance vehicle 10. Moreover, in some cases, the engine may manually or automatically shift between powering either some wheels or all four wheels of the riding yard maintenance vehicle 10.

The engine, the steering assembly 30, the cutting deck 50, the seat 20 and other components of the riding yard maintenance vehicle 10 may be operably connected (directly or indirectly) to a frame of the riding yard maintenance vehicle 10. The frame may be a rigid structure configured to provide support, connectivity and interoperability functions for various ones of the components of the riding yard maintenance vehicle 10. In some embodiments, the frame may be split or articulated such that, for example, the front wheels 34 are disposed on an opposite portion of the frame than the portion of the frame on which the back wheels 32 are disposed with respect to an articulated joint in the frame. In some embodiments, the frame may include or be operably coupled to an attachment frame 70. In this example, the attachment frame 70 may be configured to enable at least some of the attachments or accessories that can be attached thereto to be rotated from the operating position (e.g., the cutting position for the cutting deck 50) to a maintenance position at which a plane in which the cutting deck 50 of FIG. 1 is rotated greater than about 45 degrees (and in some cases 90 degrees or more). In some examples, the modular drive assembly 100 (or each instance thereof) may be operably coupled to the attachment frame 70 (or the frame of the riding yard maintenance vehicle 10) to provide support for the module drive assembly 100. However, in other cases, the modular drive assembly 100 may simply be entirely supported (physically) by the attachment or accessory to which it is attached. For example, the cutting deck 50 may provide full support for holding the weight of, and properly positioning, the modular drive assembly 100. In such examples, the only connection between the modular drive assembly 100 and the riding yard maintenance vehicle 10 may be an electrical connection.

Figure 2:
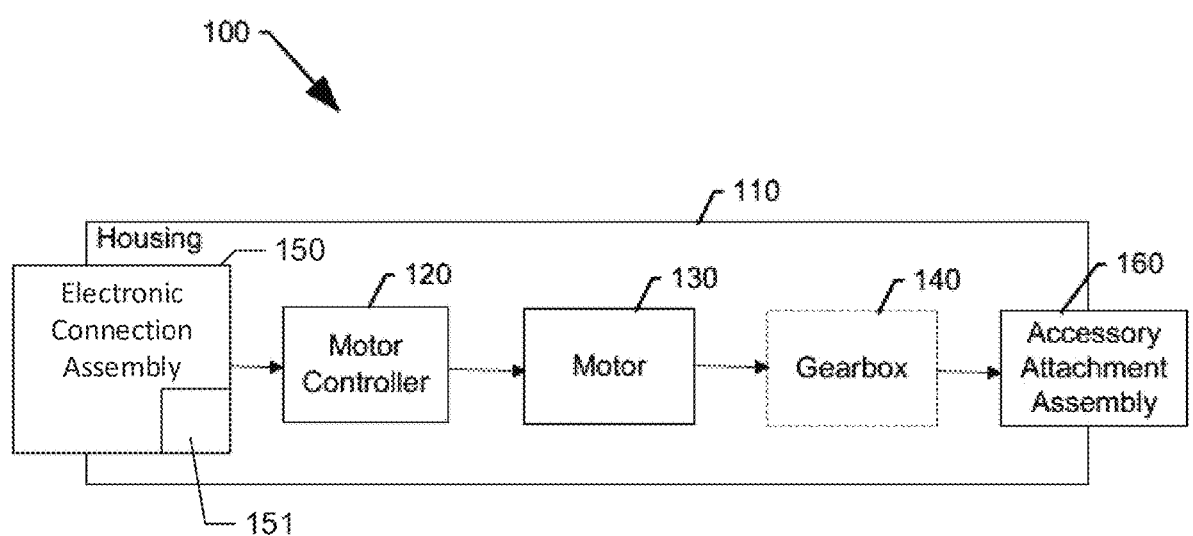
FIG. 2 illustrates a block diagram of a modular drive assembly according to an example embodiment.

FIG. 2 illustrates a block diagram of the modular drive assembly 100 according to an example embodiment. In this regard, as shown in FIG. 2, the modular drive assembly 100 may include a housing 110 (or other encapsulation) that defines the physical external structure of the drive package that forms the modular drive assembly 100. The housing 110 may fully or partially support and/or enclose various components of the modular drive assembly 100 including, for example, a motor controller 120 and a motor 130. Although not required, in some cases, the housing 110 may also fully or partially support and/or enclose a gearbox 140 (shown in dashed lines in FIG. 2 to illustrate its optional nature). The modular drive assembly 100 may also include an electronic connection assembly 150 and an accessory attachment assembly 160. The electronic connection assembly 150 and the accessory attachment assembly 160 may each extend out of the housing 110 to at least some degree in order to operably couple with the riding yard maintenance vehicle 10 (or other host device) and the accessory or attachment in some cases. However, in alternative embodiments, one or both of the electronic connection assembly 150 and the accessory attachment assembly 160 may remain recessed or otherwise located inside the housing 110 and still be enabled to interact with protruding or extending members of the riding yard maintenance vehicle 10 (or other host device) and the accessory or attachment, respectively.

The motor controller 120 may include electronics configured (e.g., via hardware, software, or a combination thereof) to operate the motor 130 in accordance with programs (selectable or fixed) or operator instructions. The motor controller 120 may therefore include driving patterns, speed instructions, or various other control parameters that may depend on the type of accessory being operated. In some cases, the operator may interact with the motor controller 120 via the control panel 40 to select the type of accessory and/or various operational parameters to be used to operate or limit operation of the accessory selected.

The motor 130 could be any suitable type of electric motor. Thus, for example, the motor 130 could be a synchronous or asynchronous AC machine, and AC or DC machine with commutators, or a brushless DC (BLDC) motor. In some embodiments, the BLDC motor may be considered to be superior for many applications. When a DC motor is used, the motor controller 120 may be required. However, when an AC motor is used, the motor controller 120 may not be necessary. Regardless of the motor type, the motor 130 may be selected to have ratings for speed, power, torque, etc., that are suited to the types of accessories that are to be driven by the modular drive assembly 100. Accordingly, in some cases, the modular drive assembly 100 itself may be one of a plurality of differently rated (and/or constructed) drive assemblies that are differentiated from each other, for example, based on the ratings of the motors therein. Thus, some instances of the modular drive assembly 100 may be configured to be used with certain lighter weight or lighter duty accessories and have correspondingly smaller motors therein. Meanwhile, other instances of the modular drive assembly 100 may be configured to be used with heavier weight or duty accessories that have correspondingly larger motors therein. In some cases, the modular drive assembly 100 and/or the accessories may be provided with instructions or listings of respective devices with which use is recommended or compatibility is optimized.

Another potential differentiator between instances or models/versions of the modular drive assembly 100 may be the presence, absence, or structure of the gearbox 140. For example, some types of accessories may operate at higher or lower rotating speeds than others, and therefore require operation with an instance of the modular drive assembly 100 that includes the gearbox 140, or may have improved performance with an instance of the modular drive assembly 100 that includes the gearbox 140. Accordingly, some models/versions of the modular drive assembly 100 may include different versions/models of the gearbox 140 (or no gearbox at all). In this regard, the types, numbers, shapes and/or physical arrangements of the gears within the gearbox 140 may be configured to provide the speed (e.g., RPM), torque or direction changes that are desired for the corresponding different version/model of the modular drive assembly 100. For example, if the modular drive assembly 100 needs to provide a speed increase or decrease function, the gearbox 140 may be configured to change the speed from the rated speed of the motor 130. Additionally or alternatively, if the modular drive assembly 100 needs to provide a direction change to attach to and drive the working assembly of the accessory or attachment, the gearbox 140 may be configured to include bevel gears and/or the like in order to change the direction for turning the input shaft of the accessory/attachment from the output direction of the output shaft of the motor 130.

In an example embodiment, electronic connection assembly 150 may include cables, contacts, plugs, receptacles and/or other electrical interfaces for operably coupling the modular drive assembly 100 to the electrical system of the host device (e.g., the riding yard maintenance vehicle 10). In some cases, the electrical connection assembly 150 may connect to the battery of the host device directly or indirectly. Meanwhile, in some cases, electrical connection assembly 150 may connect to an alternator of the host device, or an output shaft of the host device may drive a generator to which the electrical connection assembly 150 may be operably coupled.

Figure 3:
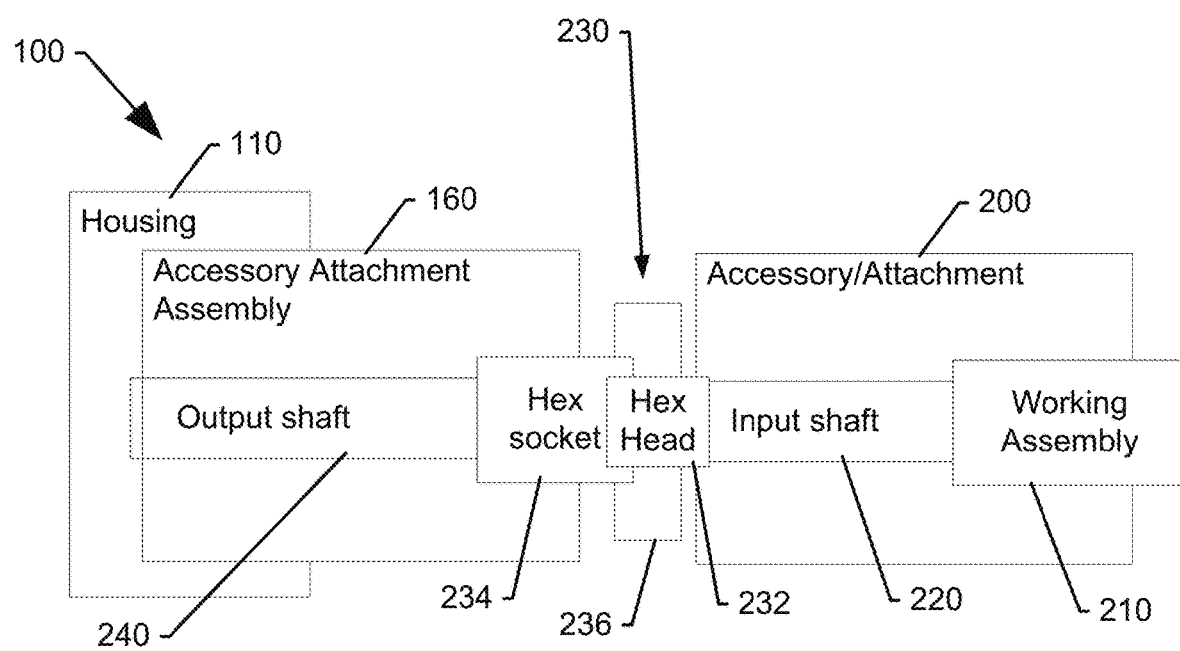
FIG. 3 illustrates a block diagram of the modular drive assembly attached to an accessory according to an example embodiment.

In an example embodiment, the accessory attachment assembly 160 may include mechanical interfaces or connectors to enable the mechanical output (e.g., rotational) of the motor 130 to be transmitted to the accessory or attachment. FIG. 3 illustrates a block diagram of one example interface between the accessory attachment assembly 160 and an accessory 200. As shown in FIG. 3, the accessory 200 (or attachment) may include a working assembly 210. The working assembly 210 may take the form of the structure(s) that do the work for which the accessory 200 is designed. For example, for a snow blower attachment 300 (see FIG. 4), the working assembly 210 may be embodied as an auger assembly 310. Similarly, for a lawn mower or brush cutter 400 (see FIG. 5) the working assembly 210 may embodied as one or more knives or blades of a blade assembly 410. For a sweeper 500 (see FIG. 6), the working assembly 210 may be embodied as a rotating brush assembly 510.

As can be appreciated from these examples, the working assembly 210 typically operates responsive to rotation of an input shaft 220. Moreover, the input shaft 220 may be operably coupled to an input interface which may be part of an interface assembly 230 for connecting or otherwise operably coupling the accessory attachment assembly 160 to the accessory 200. In some embodiments, the interface assembly 230 may be defined by at least one component located at each of the modular drive assembly 100 and the accessory 200, respectively. In the depicted example, the interface assembly 230 may include a hex head 232 that is operably coupled to the input shaft 220 of the accessory 200. The interface assembly 230 may also include a hex socket 234 at the accessory attachment assembly 160 and a locking assembly 236.

As shown in FIG. 3, the hex socket 234 may be at a distal end of an output shaft 240 that is a portion of the modular drive assembly 100. In this regard, the output shaft 240 could, for example, be a motor shaft of the motor 130. Alternatively, the output shaft 240 may be directly or indirectly coupled to the motor shaft of the motor 130. In this regard, for example, in some cases the output shaft 240 may be a shaft that is driven by the gearbox 140. Other structures are also possible. The hex socket 234 and hex head 232 could be reversed in their respective locations, or other complementary shapes (e.g., gear teeth) that fit with one another could alternatively be employed on the output shaft 240 and input shaft 220, respectively. As such, the hex socket 234 and hex head 232 should be appreciated as merely examples of coupling linkages that are configured (or suitable) to transfer rotational forces from the output shaft 240 to the input shaft 220.

In some examples, the locking assembly 236 may be a quick connect assembly that may be configured to easily enable the user to secure the respective interface portions of the interface assembly 230 together, and release them from each other. Thus, for example, the locking assembly 236 may be configured to enable the hex socket 134 to be locked (and unlocked) with respect to its connection to the hex head 232. In some cases, the locking assembly 236 may include a rotating lock or collar assembly. In this regard, for example, when the hex socket 234 is engaged with the hex head 232, the collar assembly may be configured to rotate (e.g., a quarter turn) to axially lock the hex socket 234 to the hex head 232. As such, the hex head 232 and the hex socket 234 may themselves be shaped or otherwise configured to provide rotational coupling between the output shaft 240 and the input shaft 220. Meanwhile, the locking assembly 236 may be configured to provide axial coupling (e.g., preventing axial movement of the hex socket 234 away from the hex head 232) when the locking assembly 236 is engaged or locked. Other structures configured to provide axial and rotational coupling, and to do so in a manner that is easy and simple to operate, but also robust and highly capable are also possible.

Figure 5:
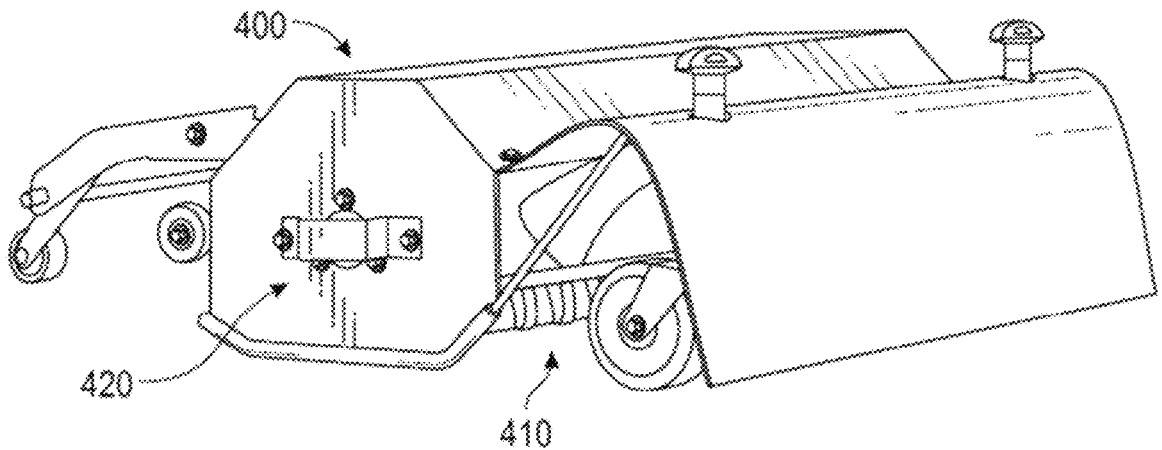
FIG. 5 illustrates a brush cutter accessory according to an example embodiment.
Figure 6:
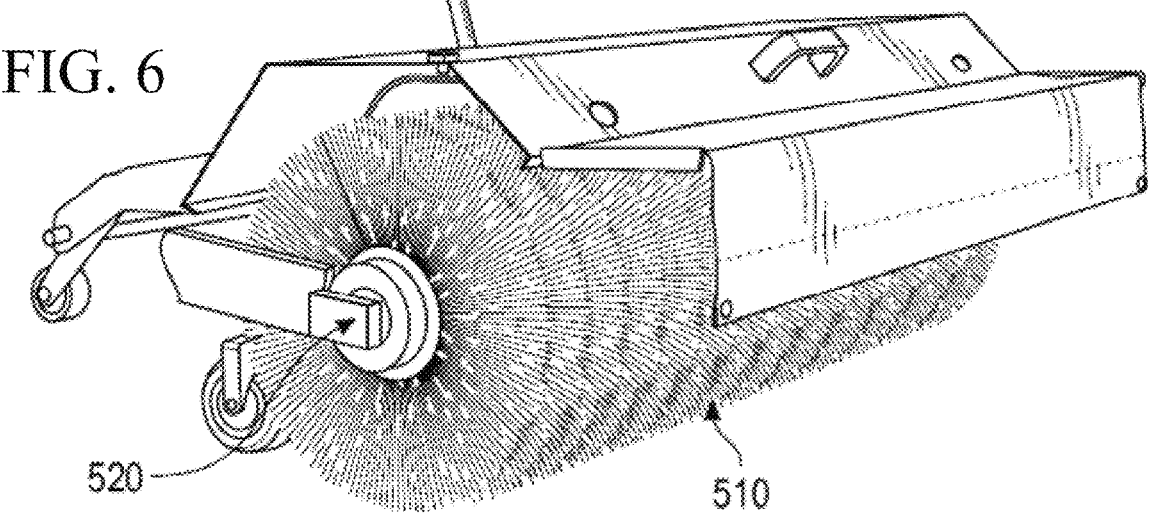
FIG. 6 illustrates a sweeper accessory according to an example embodiment.

As can be appreciated from the descriptions above, the output shaft 240 of the modular drive assembly 100 may be substantially parallel (and typically collinear) with the input shaft 220 of the accessory 200. This can be the case regardless of the orientation of the output shaft (or any possible output shaft) of the host device, since there is no mechanical coupling between any shaft of the host device and the input shaft 220 of the accessory 200. Instead, the operable coupling provided from the host device to the accessory 200 (at least for purposes of providing output torque or work) is only electrical. This generally enables the coupling between host device and the accessory 200 to remain uncomplicated and both simple and straightforward, sometimes only including a corded or cabled connection 151 for electrical power transfer. The use of belts, chains, gear assemblies, etc., may therefore be avoided with respect to the coupling between the host device and the accessory 200. As such, the use of the gearbox 140 can instead be provided for unique structural arrangements, or situations where there are certain torque or speed requirements at the output shaft 240 that require some level of conversion with respect to the otherwise output torque or speed of the motor 130. As such, a number of different accessories (including different types) can be driven by a single instance of the modular drive assembly 100. Additionally or alternatively, the same single instance of the modular drive assembly 100 can be moved between multiple host devices (including different types of host devices (e.g., riding lawn mower, push mower, etc.)) for powering a single accessory or multiple different accessories. Some example accessories are shown in FIGS. 4-6.

Figure 4:
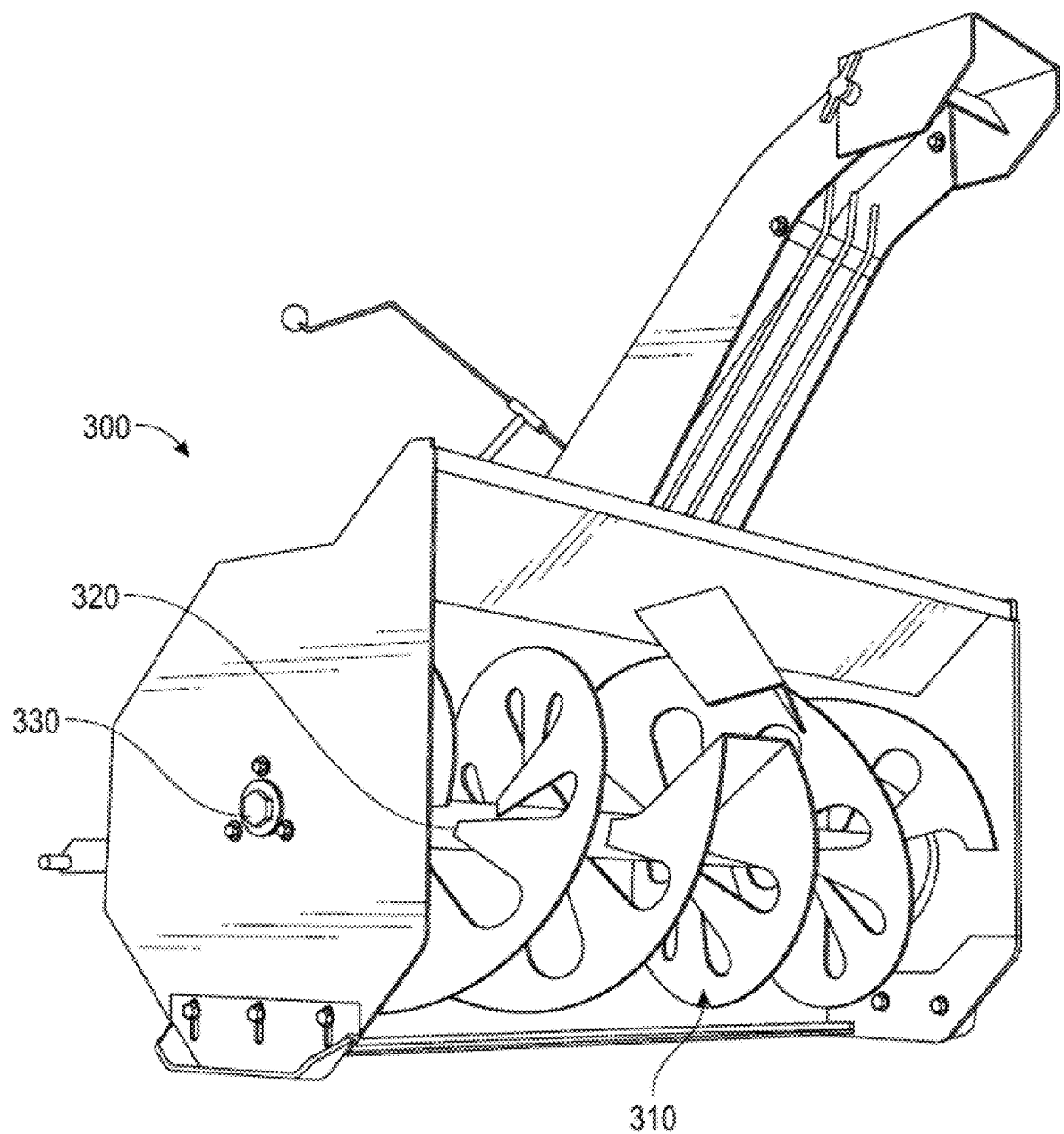
FIG. 4 illustrates a snow blower accessory according to an example embodiment.

In this regard, referring to FIG. 4, the snow blower attachment 300 described above is shown. In the example of FIG. 4, the working assembly 210 is embodied as the auger assembly 310, which rotates about shaft 320 (as an example of the input shaft 220). Hex head 330 is shown in-line with the shaft, and an instance of the modular drive assembly 100 may be attached to the side of the snow blower attachment 300 such that the output shaft 240 is in-line with the shaft 320. In some cases, a harness or mounting assembly may be provided on either the modular drive assembly 100 or the snow blower attachment 300 to physically support the modular drive assembly 100. The bolts shown surrounding the hex head 330 may be used for mounting the harness or mounting assembly. Thus, as noted above, the modular drive assembly 100 may only be electrically connected to its respective host device and although the snow blower attachment 300 may be physically or mechanically mounted to, for example, the front of a riding lawn mower, there may be no need to provide mechanical coupling of the host device to the working assembly (i.e., the auger assembly 310) of the snow blower attachment 300.

As mentioned above, FIG. 5 shows brush cutter 400 for which the working assembly 210 is the blade assembly 410. The rectangular shape on the side of the brush cutter 400 illustrates a portion of the brush cutter 400 that forms a mounting interface 420 for mounting of the modular drive assembly 100 to the side of the brush cutter 400 (i.e., such that the output shaft 240 can be in-line with the input shaft 220 of the working assembly 210 (e.g., the blade assembly 410)).

Although the host device may often be a riding lawn mower (e.g., the riding yard maintenance vehicle 10), other host devices (or even no host device) may be employed in some cases. The sweeper 500 of FIG. 6 shows a mounting interface 520 at the side of the sweeper 500 for turning of the rotating brush assembly 510. However, the sweeper 500 also includes a handlebar assembly 530 indicating that the device could be operated by a user walking behind the device as an alternative to being operably coupled to a riding lawn mower or other host device. In such a case (i.e., where there is no host device), a portable battery or other electronic power supply could be provided to power the modular drive assembly 100. The sweeper 500 could then be operated simply with the modular drive assembly 100 attached to the mounting interface 520 and the portable power supply electrically connected to the modular drive assembly 100.

Example embodiments may provide for translation of power to the working assembly 210 of any example instance of the accessory 200 such that the axis of rotation of the output shaft 240 is always aligned with the drive axis (i.e., the input shaft 220) of the accessory 200. Thus, the use of angular gears or couplers may be eliminated (thereby reducing the cost and complexity of the machines). The provision of a quick connect coupler may enable quick release/ attachment of the accessory 200 from the host device and the modular drive assembly 100. Additionally, if a drive motor (e.g., motor 130) should fail, the fact that the motor 130 is part of a replaceable module may make such replacement both easier and cheaper. Also, having an instance of the modular drive assembly 100 gives great flexibility to an owner of a host device with respect to the types of different attachments that can be purchased and easily driven by the host device. This gives the owner the ability to build his/her own ecosystem of accessories that can all be easily and efficiently powered from the host device. Moreover, differently rated modular drive assemblies may be made available for professional grade or personal use cases.

Some embodiments of the invention provide a modular drive assembly that may include an electric motor, a housing at least partially enclosing the motor, an electronic connection assembly configured to electrically couple the electric motor to a host device, and an accessory attachment assembly configured to mechanically couple the modular drive assembly to an accessory to operate a working assembly of the accessory using only electrical power provided from the host device. The accessory attachment assembly may be configured to be releasably attached to the accessory and at least one other accessory of a different type than the accessory.

In some embodiments, the module may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, modular drive assembly may further include a gearbox configured to operably couple a motor shaft of the electrical motor to an output shaft of the accessory attachment assembly. In an example embodiment, the electronic connection assembly may include a corded connection between an electrical system of the host device and the electric motor. In some cases, the working assembly may be operably coupled to an input shaft, the accessory attachment assembly may include an output shaft, and the output shaft and the input shaft may be in-line with each other when the accessory attachment assembly is operably coupled to the accessory. In an example embodiment, the output shaft and the input shaft may be operably coupled to each other via an interface assembly. The interface assembly may include coupling linkages disposed at respective ends of the output shaft and the input shaft, and the coupling linkages may be configured to transfer rotational motion from the output shaft to the input shaft. In some cases, the coupling linkages may include a hex head at one of the output shaft or the input shaft, and a hex socket at the other of the input shaft or the output shaft. In an example embodiment, the interface assembly further comprises a locking assembly. In some cases, the locking assembly may include a quarter turn quick connect coupling. In an example embodiment, the coupling linkages provide rotational coupling between the output shaft and the input shaft, and wherein the locking assembly prevents axial movement between the output shaft and the input shaft when the locking assembly is engaged or locked. In some cases, the host device may include a riding yard maintenance vehicle, and the accessory and the at least one other accessory may each be respective different types of accessories selected from a group consisting of a cutting deck, a snow blower, a brush cutter, and a sweeper. In an example embodiment, the modular drive assembly may further include a motor controller operably coupled to the electric motor to control operation of the electric motor, where the motor controller is housed in the housing along with the motor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are That which is claimed:

1. A modular drive assembly comprising:
an electric motor;
a housing at least partially enclosing the motor;
an electronic connection assembly configured to electrically couple the electric motor to a host device; and
an accessory attachment assembly configured to mechanically couple the modular drive assembly to an accessory to operate a working assembly of the accessory using only electrical power provided from the host device via a purely electrical interface,
wherein the accessory attachment assembly is configured to be releasably attached to the accessory and at least one other accessory of a different type than the accessory,
and wherein the host device comprises a riding yard maintenance vehicle.

2. The modular drive assembly of claim 1, further comprising a gearbox configured to operably couple a motor shaft of the electrical motor to an output shaft of the accessory attachment assembly.

3. The modular drive assembly of claim 1, wherein the electronic connection assembly comprises a corded connection between an electrical system of the host device and the electric motor.

4. The modular drive assembly of claim 1, wherein the working assembly is operably coupled to an input shaft,
wherein the accessory attachment assembly comprises an output shaft, and
wherein the output shaft and the input shaft are in-line with each other when the accessory attachment assembly is operably coupled to the accessory.

5. The modular drive assembly of claim 4, wherein the output shaft and the input shaft are operably coupled to each other via an interface assembly,
wherein the interface assembly comprises coupling linkages disposed at respective ends of the output shaft and the input shaft, and
wherein the coupling linkages are configured to transfer rotational motion from the output shaft to the input shaft.

6. The modular drive assembly of claim 5, wherein the coupling linkages include a hex head at one of the output shaft or the input shaft, and a hex socket at the other of the input shaft or the output shaft.

7. The modular drive assembly of claim 5, wherein the interface assembly further comprises a locking assembly.

8. The modular drive assembly of claim 7, wherein the locking assembly comprises a quarter turn quick connect coupling.

9. The modular drive assembly of claim 7, wherein the coupling linkages provide rotational coupling between the output shaft and the input shaft, and wherein the locking assembly prevents axial movement between the output shaft and the input shaft when the locking assembly is engaged or locked.

10. The modular drive assembly of claim 1,
wherein the accessory and the at least one other accessory comprise respective different types of accessories selected from a group consisting of a cutting deck, a snow blower, a brush cutter, and a sweeper.

11. The modular drive assembly of claim 1, further comprising a motor controller operably coupled to the electric motor to control operation of the electric motor,
wherein the motor controller is housed in the housing along with the electric motor.

12. A riding yard maintenance vehicle comprising:
a frame to which wheels of the riding yard maintenance vehicle are attachable; and
a steering assembly operably coupled to one or more of the wheels of the riding yard maintenance vehicle to provide steering inputs to the one or more of the wheels by an operator of the riding yard maintenance vehicle,
wherein the riding yard maintenance vehicle is configurable as a host device responsive to operable coupling of an attachment and a modular drive assembly to the frame of the riding yard maintenance vehicle,
wherein the modular drive assembly comprises:
an electric motor;
a housing at least partially enclosing the motor;
an electronic connection assembly configured to electrically couple the electric motor to the host device; and
an accessory attachment assembly configured to mechanically couple the modular drive assembly to the accessory to operate a working assembly of the accessory using only electrical power provided from the host device via a purely electrical interface,
wherein the accessory attachment assembly is configured to be releasably attached to the accessory and at least one other accessory of a different type than the accessory.

13. The riding yard maintenance vehicle of claim 12, further comprising a gearbox configured to operably couple a motor shaft of the electrical motor to an output shaft of the accessory attachment assembly.

14. The riding yard maintenance vehicle of claim 12, wherein the electronic connection assembly comprises a corded connection between an electrical system of the host device and the electric motor.

15. The riding yard maintenance vehicle of claim 12, wherein the working assembly is operably coupled to an input shaft,
wherein the accessory attachment assembly comprises an output shaft, and
wherein the output shaft and the input shaft are in-line with each other when the accessory attachment assembly is operably coupled to the accessory.

16. The riding yard maintenance vehicle of claim 15, wherein the output shaft and the input shaft are operably coupled to each other via an interface assembly,
wherein the interface assembly comprises coupling linkages disposed at respective ends of the output shaft and the input shaft, and
wherein the coupling linkages are configured to transfer rotational motion from the output shaft to the input shaft.

17. The riding yard maintenance vehicle of claim 16, wherein the coupling linkages include a hex head at one of the output shaft or the input shaft, and a hex socket at the other of the input shaft or the output shaft.

18. The riding yard maintenance vehicle of claim 16, wherein the interface assembly further comprises a locking assembly.

19. The riding yard maintenance vehicle of claim 18, wherein the locking assembly comprises a quarter turn quick connect coupling, and
- wherein the coupling linkages provide rotational coupling between the output shaft and the input shaft, and wherein the locking assembly prevents axial movement between the output shaft and the input shaft when the locking assembly is engaged or locked.

20. The riding yard maintenance vehicle of claim 12, further comprising a motor controller operably coupled to the electric motor to control operation of the electric motor,
- wherein the motor controller is housed in the housing along with the electric motor, and
- wherein the accessory and the at least one other accessory comprise respective different types of accessories selected from a group consisting of a cutting deck, a snow blower, a brush cutter, and a sweeper.

* * * * *

UNITED STATES PATENT AND TRADEMARK OFFICE
CERTIFICATE OF CORRECTION

| | | |
|---|---|---|
| PATENT NO. | : 12,024,014 B2 | Page 1 of 1 |
| APPLICATION NO. | : 17/051569 | |
| DATED | : July 2, 2024 | |
| INVENTOR(S) | : Anders Flygare | |

It is certified that error appears in the above-identified patent and that said Letters Patent is hereby corrected as shown below:

On the Title Page

In Item (73), the Assignee, "HUSQVARNA" should read -- HUSQVARNA AB --

Signed and Sealed this
Twenty-sixth Day of November, 2024

Katherine Kelly Vidal
*Director of the United States Patent and Trademark Office*